(12) United States Patent
Raffay et al.

(10) Patent No.: US 11,822,944 B2
(45) Date of Patent: Nov. 21, 2023

(54) TOKENIZATION OF SOFTWARE APPLICATIONS AND TECHNIQUES FOR PROVIDING APPLICATION FUNCTIONALITY VIA WEBPAGE NON-FUNGIBLE TOKENS

(71) Applicant: Concept Source, Inc., Plainview, NY (US)

(72) Inventors: Charles Raffay, Jensen Beach, FL (US); Robert Fallas, Huntington, NY (US)

(73) Assignee: CONCEPT SOURCE, INC., Plainview, NY (US)

( * ) Notice: Subject to any disclaimer, the term of this patent is extended or adjusted under 35 U.S.C. 154(b) by 119 days.

(21) Appl. No.: 17/651,125

(22) Filed: Feb. 15, 2022

(65) Prior Publication Data
US 2023/0259378 A1    Aug. 17, 2023

(51) Int. Cl.
*G06F 9/455* (2018.01)
*G06Q 20/36* (2012.01)

(52) U.S. Cl.
CPC ......... *G06F 9/45529* (2013.01); *G06Q 20/36* (2013.01)

(58) Field of Classification Search
CPC .............................. G06Q 20/36; G06F 9/45529
See application file for complete search history.

(56) References Cited

U.S. PATENT DOCUMENTS

| 9,578,085 | B2 | 2/2017 | Smith et al. |
| 9,904,923 | B2 | 2/2018 | Mattsson et al. |
| 10,262,128 | B2 | 4/2019 | Bomar et al. |
| 10,600,009 | B1 | 3/2020 | Augustine et al. |
| 11,075,891 | B1 | 7/2021 | Long et al. |
| 11,102,255 | B2 | 8/2021 | Davis et al. |

(Continued)

FOREIGN PATENT DOCUMENTS

| AU | 2021902227 | 8/2021 |
| WO | 2019139678 A1 | 7/2019 |

(Continued)

OTHER PUBLICATIONS

Wen et al., "Detecting Malicious Websites in Depth through Analyzing Topics and Web-pages" (Year: 2018).*

(Continued)

*Primary Examiner* — Phillip H Nguyen
(74) *Attorney, Agent, or Firm* — M&B IP Analysts, LLC (57) ABSTRACT

Techniques for tokenizing software applications (apps) and for providing application functionality using webpage non-fungible tokens (NFTs). A method includes encoding a webpage associated with apps into portions of code. Each portion of code causes tasks of the respective apps to be performed when executed by a device. The method also includes creating a database including at least webpage nodes and NFT nodes in which the encoded portions of code are stored among the nodes, one of the webpage nodes is associated with the webpage, one or more of the NFT nodes is connected to the webpage node that is associated with the webpage, and each of the NFT nodes corresponds to one of the apps. The method also includes providing the portions of code to a device authorized by an owner of the NFT node, thereby delivering the code for providing application functionality to the authorized device.

19 Claims, 7 Drawing Sheets

(56) References Cited

U.S. PATENT DOCUMENTS

| | | | |
|---|---|---|---|
| 2007/0245353 A1* | 10/2007 | Ben-Dor | G06F 9/542 |
| | | | 719/318 |
| 2019/0287175 A1 | 9/2019 | Hill et al. | |
| 2019/0303892 A1 | 10/2019 | Yantis et al. | |
| 2019/0392511 A1 | 12/2019 | Mahajan et al. | |
| 2020/0034869 A1 | 1/2020 | Harrison | |
| 2020/0111068 A1 | 4/2020 | Scarselli | |
| 2020/0160289 A1 | 5/2020 | Mahajan et al. | |
| 2020/0184041 A1 | 6/2020 | Andon et al. | |
| 2020/0184547 A1 | 6/2020 | Andon et al. | |
| 2020/0242105 A1 | 7/2020 | Rich et al. | |
| 2020/0272713 A1 | 8/2020 | Black | |
| 2020/0273048 A1 | 8/2020 | Andon et al. | |
| 2021/0174432 A1 | 6/2021 | Gonnaud et al. | |
| 2021/0248594 A1 | 8/2021 | Yantis et al. | |
| 2021/0256070 A1 | 8/2021 | Tran et al. | |
| 2021/0295324 A1 | 9/2021 | Kerseboom et al. | |
| 2022/0069996 A1* | 3/2022 | Xue | H04L 9/3239 |

FOREIGN PATENT DOCUMENTS

| | | |
|---|---|---|
| WO | 2020118297 A1 | 6/2020 |
| WO | 2020214880 A1 | 10/2020 |

OTHER PUBLICATIONS

Liang et al., "The Scheme of Detecting Encoded Malicious Web Pages Based on Information Entropy" (Year: 2016).*

Chang et al., "Automatic information extraction from semi-structured Web pages by pattern discovery" (Year: 2003).*

Wang et al., "Non-Fungible Token (NFT): Overview, Evaluation, Opportunities and Challenges" (Year: 2015).*

Karandikar et al., "Blockchain Based Transaction System with Fungible and Non-Fungible Tokens for a Community-Based Energy Infrastructure" (Year: 2021).*

* cited by examiner

TOKENIZATION OF SOFTWARE APPLICATIONS AND TECHNIQUES FOR PROVIDING APPLICATION FUNCTIONALITY VIA WEBPAGE NON-FUNGIBLE TOKENS

TECHNICAL FIELD

The present disclosure relates generally to software application (app) delivery, and more specifically to providing software applications and application functionality via NFTs.

BACKGROUND

As computing devices have become a part of daily life, delivery of specific computer programs to these computing devices has become increasingly relevant to aiding in daily activities. Many modern computing devices like smartphones, personal computers, tablet computers, and laptop computers utilize software applications (often referred to as "applications" or "apps"), which are computer programs designed to carry out a specific task other than operation of the computing device on which the app is installed. Use of these apps has expanded so much that the word "apps" has entered the modern lexicon and the number of apps installed on any given device can easily be in the dozens.

Due to the convenience and expediency that can be achieved by using software applications to provide new computing functions, users often install many apps on their computing devices. The kinds of apps installed may be used to perform tasks such as, but not limited to, browsing the web, viewing emails, making purchases, playing games, watching videos, listening to music or podcasts, making phone or video calls, sending messages, navigating, and many more.

Some of these apps may come preinstalled on a device, while others are downloaded after the device is purchased. The subsequently downloaded apps may be acquired through an app store, which is a digital distribution platform used to sell and deliver apps. A typical app installation process involves a user opening an app store, selecting an app to acquire, making any necessary transactions (for example, using a credit card to purchase the application), and proceeding to download the app which is then installed on the user's device. Although this process is somewhat convenient for users, there are some downsides.

Challenges with existing solutions for delivering apps include, but are not limited to, cost, authentication, version restrictions, processing payments, and more. With respect to cost, although many apps are free, some apps either have an initial price (e.g., $1.99 to download the app) or require in-app purchases which may be made via transactions through the app store.

Because of the ubiquity of certain app store providers, these providers can charge a premium to app developers seeking to host their apps on the app store. These premiums typically come in the form of royalties as high as 30% of the cost of the app itself (or of any in-app purchases), which means that the software developer must either absorb these costs in order to make their app prices competitive or must increase the app's cost to consumer in order to maintain profitability. This situation has raised concerns about anti-competitive and monopolistic practices about app store providers, as app developers often feel compelled to use these platforms in order to ensure that their apps reach the broadest user base possible.

Other disadvantages of current app store practices relate to authenticating users and conducting transactions, which often prove inconvenient for users who may be asked to complete multiple information-providing steps before actually proceeding to download an application. Further, once the app is downloaded, the user may need to either create an account with the app developer or verify their identity in order to access various app features. This inconvenience may be compounded when a user wants to download the same app on multiple devices.

Some shortcuts for the authentication and payment issues exist (for example, saving a payment method with the app store provider), but these shortcuts themselves often have disadvantages. For example, saving a credit card number with an app store provider may leave the user's payment information vulnerable in the event of a hack or may open up opportunities for children to inadvertently rack up significant charges on in-app purchases.

Yet another disadvantage of existing app delivery solutions is that apps must often be developed differently for different types of devices. More specifically, different versions of apps are usually developed for different operating systems. As a result, a user wanting a given app on multiple devices (for example, a smartphone and a laptop computer) may need to download different versions of the app from different app stores. This is very inconvenient for uses and increases the likelihood that a user will forget to update their software, thereby introducing new security vulnerabilities.

Given the above challenges and many more, new methods for delivering software applications and for providing application functionality are highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing application functionality via tokenized software applications. The method comprises: encoding a webpage into at least one portion of code, wherein the webpage is associated with at least one software application, wherein the at least one software application is associated with at least one computing task, wherein the at least one portion of code at least configures the device to perform the at least one computing task when the at least one portion of code executed on the device; creating a database including a plurality of nodes, the plurality of nodes including a webpage node associated with the webpage and at least one non-fungible token (NFT) node associated with the at least one software application, wherein the encoded at least one portion of code of the webpage is stored among a portion of the plurality of nodes, wherein the at least one NFT node is connected to the webpage node, wherein each of the at least one NFT node corresponds to one of the at least one software application; and providing the at least one portion of code to a device authorized by an owner of the at least one NFT node.

Certain embodiments disclosed herein also include a non-transitory computer readable medium having stored thereon causing a processing circuitry to execute a process, the process comprising: encoding a webpage into at least one portion of code, wherein the webpage is associated with at least one software application, wherein the at least one software application is associated with at least one computing task, wherein the at least one portion of code at least configures the device to perform the at least one computing task when the at least one portion of code executed on the device; creating a database including a plurality of nodes, the plurality of nodes including a webpage node associated with the webpage and at least one non-fungible token (NFT) node associated with the at least one software application, wherein the encoded at least one portion of code of the webpage is stored among a portion of the plurality of nodes, wherein the at least one NFT node is connected to the webpage node, wherein each of the at least one NFT node corresponds to one of the at least one software application; and providing the at least one portion of code to a device authorized by an owner of the at least one NFT node.

Certain embodiments disclosed herein also include a system for providing application functionality via tokenized software applications. The system comprises: a processing circuitry; and a memory, the memory containing instructions that, when executed by the processing circuitry, configure the system to: encode a webpage into at least one portion of code, wherein the webpage is associated with at least one software application, wherein the at least one software application is associated with at least one computing task, wherein the at least one portion of code at least configures the device to perform the at least one computing task when the at least one portion of code executed on the device; create a database including a plurality of nodes, the plurality of nodes including a webpage node associated with the webpage and at least one non-fungible token (NFT) node associated with the at least one software application, wherein the encoded at least one portion of code of the webpage is stored among a portion of the plurality of nodes, wherein the at least one NFT node is connected to the webpage node, wherein each of the at least one NFT node corresponds to one of the at least one software application; and provide the at least one portion of code to a device authorized by an owner of the at least one NFT node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for tokenizing software applications (apps) and for providing application functionality via webpage non-fungible tokens (NFTs). The disclosed embodiments provide new techniques for delivering apps and for allowing users to access app features that do not require use of existing app stores or similar platforms. Further, the disclosed embodiments can be utilized in order to allow users to access apps in a manner that is agnostic to operating system or otherwise may be independent of device type. The disclosed embodiments also provide various techniques that can be utilized to facilitate authentication and transaction processing for tokenized apps. Moreover, the disclosed embodiments can be applied to enable transferring ownership of apps after they are purchased.

The disclosed embodiments include encoding webpages having software application content and storing the encoded webpages among nodes in a database. More specifically, various disclosed embodiments involve encoding a webpage into one or more portions of code that include instructions for providing unique digital assets in the form of an app and its associated application functionality, and tokenizing the encoded webpage by creating nodes representing the webpage as well as nodes representing NFTs indicating ownership of the unique assets associated with the webpage. The application functionality includes the specific tasks which the underlying apps are designed to provide when the apps are installed and executed on user devices.

In an embodiment, a request to mint an app as an NFT is received. A webpage including computer code of the app is created or identified. The webpage including the computer code of the app is encoded into one or more portions of code such that, when a device navigates to the webpage, and the code of the webpage is executed by the device, the device becomes configured to perform the tasks of the app. The encoded webpage may further include instructions for accessing the database in which the webpage is represented as a webpage node in order to identify other connected nodes of the database to be used for providing additional functionality such as authentication or transaction processing.

A database is created or updated such that the database includes one or more webpage nodes representing the webpage and one or more NFT nodes representing NFTs that indicate ownership of a respective app whose functionality is provided via the webpage. The portions of the encoded webpage are distributed among nodes in the database. The webpage (or a portion thereof) represents a digital asset in the form of an app. Once encoded, the portions of code of the webpage include code for performing tasks associated with a respective app (e.g., tasks corresponding to app features normally provided by the app itself).

Once the database including the webpage nodes and the NFT nodes is created or updated, the database may optionally be stored on a decentralized ledger such as a blockchain. Further, at any point after the database is created or updated, the NFT nodes may be transferred (thereby transferring the NFTs represented by the NFT nodes) by altering connections between nodes in the database, thereby further updating the database and effectively allowing for transferring ownership of applications.

When a user associated with a given NFT node (e.g., a user of a wallet represented by a wallet node connected to the NFT node in the database) desires to access the app corresponding to the NFT node (i.e., the app of the webpage node connected to the NFT node in the database), the user may request to access the app, for example by navigating to a uniform resource locator (URL) of the corresponding webpage. This request may require some form of authentication, for example, via a wallet device or application associated with the NFT node. The requested web content is provided to a device authorized by the user such as, but not limited to, a user device operated by the user. Specifically, the respective portions of code of the web content to be accessed are provided. When these portions of code are executed on the user device, the user device becomes configured to provide application functionality encoded in instructions of the web content. This allows the user to effectively access the tokenized app via the corresponding webpage.

The disclosed embodiments utilize encoded portions of web-based app content tokenized as nodes in a database in order to effectively enable tokenizing apps as NFTs and to provide application functionality by accessing webpages associated with these app NFTs. More specifically, the disclosed embodiments provide techniques which manipulate interactions with the Internet in order to transform apps into NFTs, namely, by encoding webpages including instructions for providing application functionality of apps into portions of code, distributing the encoded webpages among a database, and connecting webpage nodes representing the encoded webpages to respective NFT nodes representing ownership of a webpage or portion thereof as an NFT. The disclosed embodiments further include techniques for transforming apps into webpages in order to enable tokenization of apps via such tokenization of webpages.

The disclosed embodiments further provide techniques for utilizing various nodes in order to allow for modular enforcement of various policies related to creation of tokens, use of tokens, access to tokens, and the like. These various nodes therefore allow for enforcing policies and controlling access to applications tokenized into NFTs as described herein.

Additionally, various disclosed embodiments allow for providing new NFT-related functions. Such new NFT-related functions may include, but are not limited to, allowing for multi-ownership wallets in which multiple entities are assigned ownership of a single jointly owned wallet, tokenizing discrete sections of the same webpage, aggregating content from multiple webpages of commonly owned tokens into a single webpage (for example, providing portions of displays related to multiple apps at once to provide a dashboard or unified app experience), and the like.

Various disclosed embodiments further allow for providing app NFTs without requiring transfers involving the NFTs to be recorded on a blockchain. In some embodiments, NFT nodes included in a database as described herein can be recorded in a centralized database regardless of whether such nodes are also stored on a blockchain. Storing the tokens in a centralized database also provides portability, thereby allowing token records to be transferred to a new blockchain as needed. In this regard, it is noted that recording tokens in both a centralized database and a decentralized data structure such as a blockchain allows for providing this portability for centralized records while providing an immutable ledger that can be utilized to validate accuracy of records stored in the centralized database.

Figure 1:
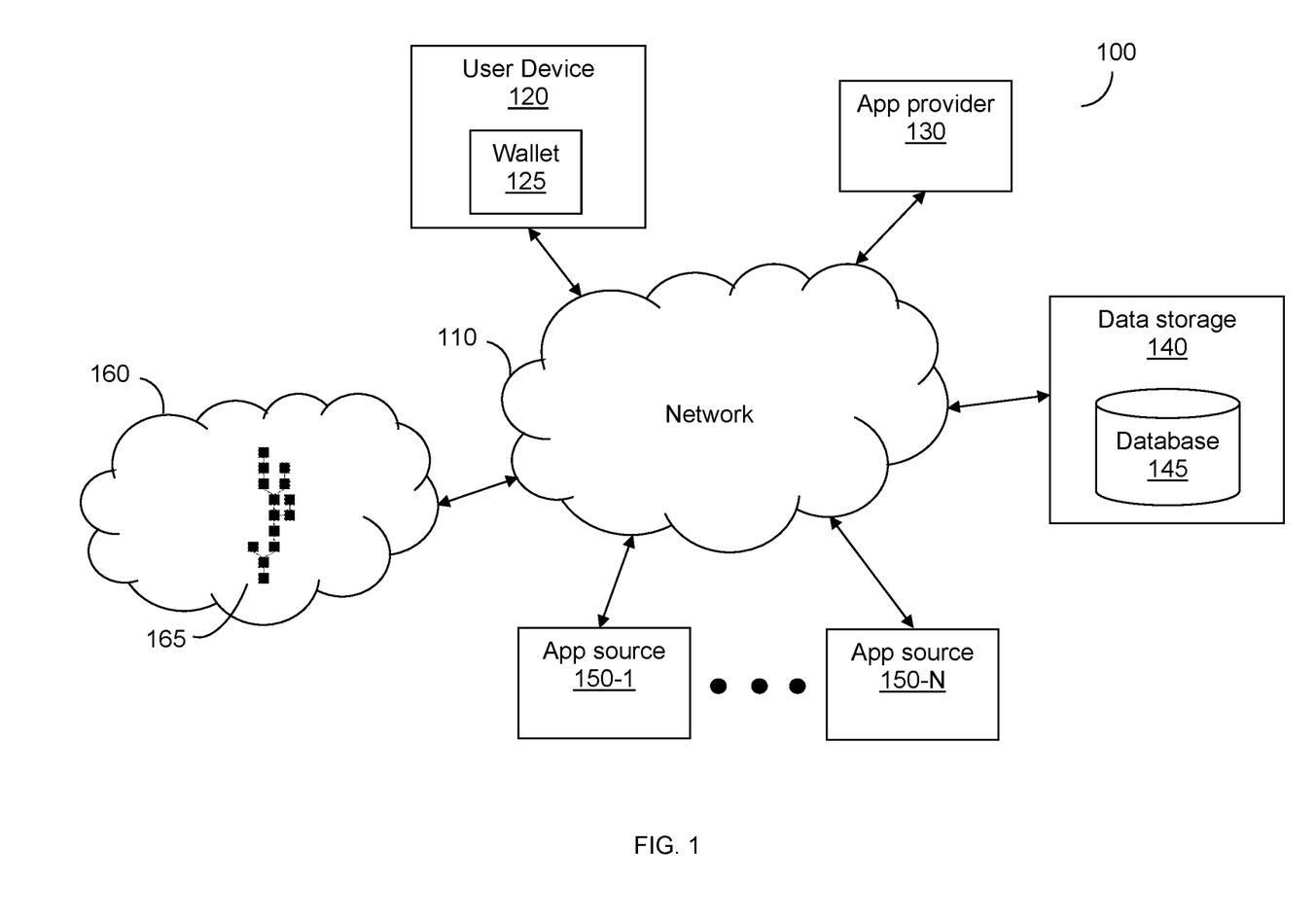
FIG. 1 is a network diagram utilized to describe various disclosed embodiments.

FIG. 1 shows an example network diagram 100 utilized to describe the various disclosed embodiments. In the example network diagram 100, a user device 120, a non-fungible token (NFT) provider 130, a data storage 140, a plurality of app sources 150-1 through 150-N (hereinafter referred to individually as an app source 150 and collectively as app sources 150, merely for simplicity purposes), and a blockchain network 160 communicate via a network 110.

The network 110 may be, but is not limited to, a wireless, cellular or wired network, a local area network (LAN), a wide area network (WAN), a metro area network (MAN), the Internet, the worldwide web (WWW), similar networks, and any combinations thereof.

The user device 120 may be, but is not limited to, a personal computer, a laptop, a tablet computer, a smartphone, a wearable computing device, or any other device capable of receiving and executing app code in order to configure the user device to perform new tasks (i.e., aside from tasks for operating the user device 120). The user device is equipped with one or more input/output (I/O) devices (not depicted in FIG. 1) which can display or otherwise project app-related content associated with apps tokenized as described herein and owned by the user of the user device 120. To this end, the user device 120 may have installed thereon a web browser (not shown) or other software for viewing or otherwise navigating to webpages.

As depicted in FIG. 1, the user device 120 includes a wallet 125. In this implementation, the wallet 125 may be a program stored and executed on the user device 120. In other implementations, the wallet 125 may be a device (not depicted in FIG. 1) connected to the user device 120. In yet other embodiments, the wallet 125 may be stored on another system (not depicted in FIG. 1) such as a server of an NFT platform or another server owned by a provider of NFT services. The wallet 125 stores ownership data used to access the media content of webpages represented in the database 145 such as, but not limited to, token ownership data, authentication credentials, and the like.

The app provider 130 is configured to at least encode webpages and create databases (e.g., a database 145) including nodes and webpage code as described herein. The app provider 130 may be further configured to provide app-related content associated with apps tokenized as webpage NFTs to owners of NFT nodes in the database 145 as described herein.

Figure 2A:
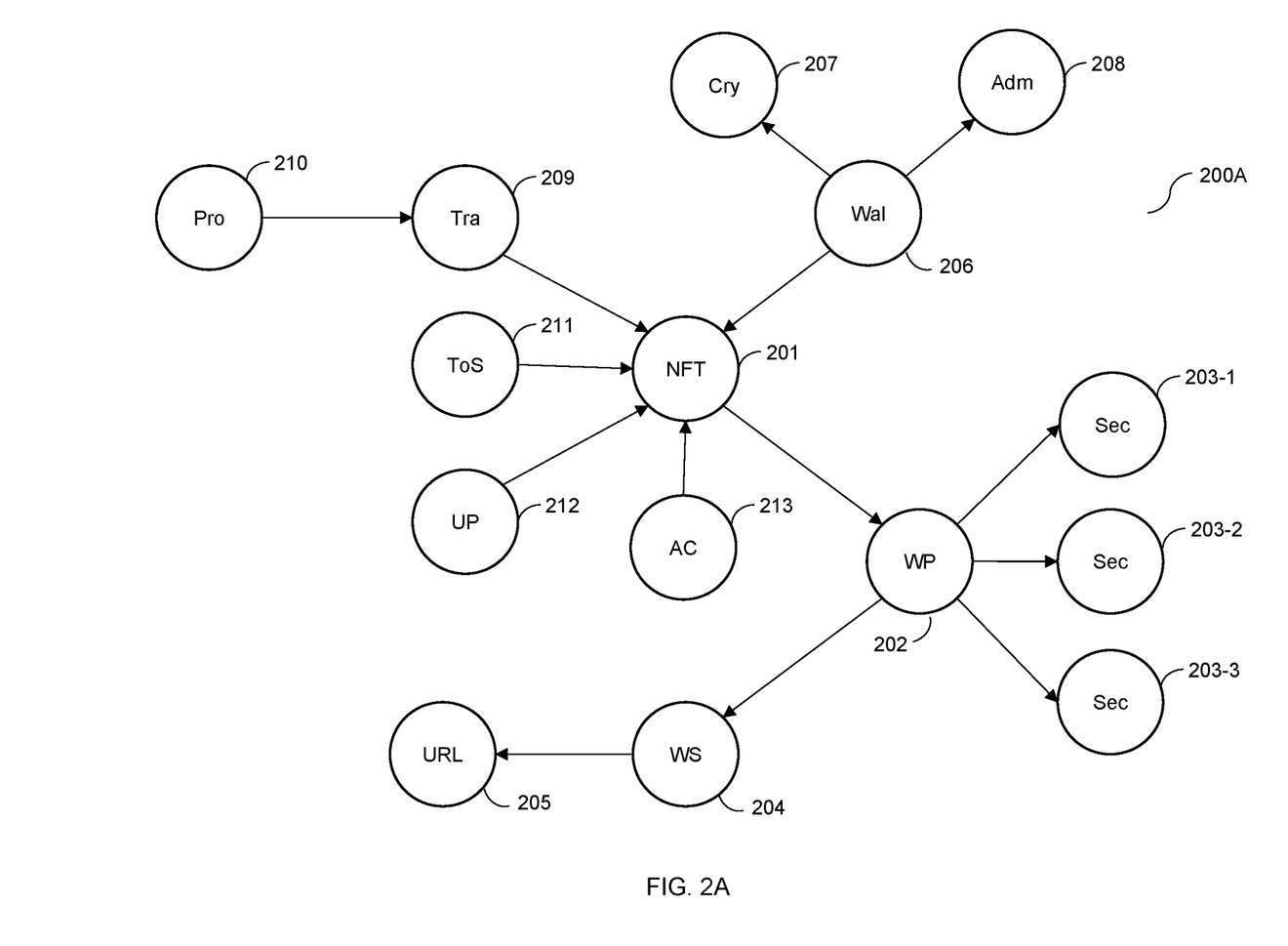
FIG. 2A is a visual depiction of nodes in a database realized as a hypergraph.

The data storage 140 stores a database 145 that is at least partially populated with code and nodes created by the app provider 130 as described herein. The database 145 stores nodes (not depicted in FIG. 1) connected to each other (e.g., via edges). The nodes at least include webpage nodes associated with respective webpages and NFT nodes associated with NFTs defined with respect to apps of the webpages. The webpages in the graphs include webpages containing code for performing tasks of corresponding apps. In an embodiment, the database 145 may be realized as a graph (e.g., a hypergraph such as a multi-tenant temporal hypergraph). An example illustration of nodes in the database 145 realized as a graph is described further below with respect to FIG. 2.

The app sources 150 store content of webpages including, but not limited to, apps. Code of such apps is integrated into webpages that are encoded by the app provider 130 as described herein and stored in the database 145 in order to enable providing the appropriate application functionality when an owner of an NFT (e.g., a user of the user device 120) navigates to the respective webpages or otherwise requests to access the apps associated with the NFTs they own.

The blockchain network 160 includes multiple computing nodes (not shown), each computing node storing a copy of a blockchain 165. In various embodiments, the database 145 or a copy of the database 145 may be stored on the blockchain 165, thereby enabling the benefits of such blockchain use discussed above. To this end, in some embodiments, the app provider 130 may be configured to upload transactions to the blockchain 165 as the database 145 is updated. The transactions uploaded to the blockchain 165 may include a full copy of the database 145 or one or more changes to the existing copy of the database 145.

It should be noted that the network diagram 100 is merely an example, and that other combinations of networked components may be equally utilized without departing from the scope of the disclosure. Further, it should be noted that all components illustrated in FIG. 1 are depicted as communicating via a single network 110 merely for simplicity, but that different networks or no networks may be used for different communications among the components without departing from the scope of the disclosure.

FIG. 2A is a non-limiting example visual depiction 200A of nodes in a database realized as a hypergraph.

The example visual depiction 200A includes various nodes connected to an NFT node 201. The NFT node 201 represents a tokenized version of a unique asset (not shown) and, specifically according to various disclosed embodiments, the unique asset is an app or portion thereof (e.g., certain features of an app that can be discretely defined with respect to distinct portions of code). Each app or portion thereof is associated with certain tasks and has code for performing these tasks such that, when the app or portion is executed on a device (e.g., the user device 120, FIG. 1), the device becomes configured to perform these associated tasks. Instructions for performing associated tasks of the app can be included in a webpage such that the webpage can be encoded into portions of code (e.g., code in hypertext markup language) for performing tasks associated with that app.

In some embodiments, the NFT node 201 may further include transaction data indicating historical transactions involving the NFT represented by the NFT node 201 (e.g., transactions which resulted in modification of the database involving changing connections between the NFT node 201 and wallet nodes or owning entity nodes), the initial creation of the NFT node 201, both, and the like. Consequently, the NFT node 201 may also include a complete history of ownership of the NFT. Storing such historical data allows the NFT node 201 to serve as a proof of authenticity or otherwise as a proof of ownership history for the NFT represented by the NFT node 201.

The NFT node 201 is connected to a webpage (WP) node 202 representing a corresponding webpage tokenized via the hypergraph. In an embodiment, the webpage node 202 represents a webpage that functions as one or more apps, for example, by having code for performing tasks of the apps. When a user views or otherwise navigates to the webpage represented by the webpage node 202, the user can access app functionality of the corresponding apps.

In various embodiments, the NFT node 201 includes one or more portions of code created by encoding the corresponding webpage represented by the webpage node 202 connected to the NFT node 201. Such portions of code may include instructions in formats such as, but not limited to, cascading style sheets (CSS), Javascript, hypertext markup language (HTML), combinations thereof, and the like. In other embodiments (not shown), such portions of code may be stored in code nodes (not shown) which are distinct from the NFT node 201 and are connected to the NFT node 201, the webpage node 202, or both. Such portions of code can be provided to an authorized device, thereby allowing such an authorized device to use the portions of code to generate a view of the webpage and perform any tasks of the corresponding apps of the webpage.

The portions of code for the webpage associated with the webpage node 202 may further include code for providing functionality that facilitates app usage. As non-limiting examples, such functionality may include accessing the database in order to identify nodes connected to the NFT node 201, to the webpage node 202, or both. Accessing the database and identifying such connected nodes may be utilized to facilitate providing information which may be needed for certain app features such as, but not limited to, authentication, payment processing, both, and the like. As a non-limiting example, the wallet node 206 may be associated with a particular user and therefore may be used to verify the user's identity, thereby serving as a factor of authentication. Further, any cryptocurrency (e.g., as represented by the cryptocurrency node 207) or other units of currency represented by nodes associated with the wallet node 206 may be used for payments in transactions made via the app. Providing such app-relevant functionality via accessing nodes in the database can reduce the number of interactions and time spent interacting with the user, thereby improving user experiences with respect to user interfaces displayed on a user device such as the user device 120.

In some embodiments, the webpage node 202 may further be connected to multiple section nodes such as section (Sec) nodes 203-1 through 203-3. The section nodes 203-1 through 203-3 represent different sections of the webpage represented by the connected webpage node 202. By representing sections of webpages as distinct nodes, webpage tokenization may be realized in a more granular fashion, i.e., such that multiple tokens may be created for a single webpage and multiple owning entities may each effectively own a different portion of the same webpage. The portion of a webpage for a respective owning entity may be represented and rendered as a distinct webpage including the corresponding content owned by that entity.

Further, in at least some embodiments, any or all of the nodes in the graph, and in particular any of the section nodes 203, may be associated with respective start times, end times, or both. These start and end times may be included in data of their respective nodes, may be implemented as rules included in other nodes (e.g., the usage policy node 212), or a combination thereof (e.g., the usage policy node 212 may include rules for activating and deactivating based on start and end times, and each node may store its own start and end time data).

When the section nodes 203 are associated with start and/or end times, the sections associated with webpages may be activated when their respective start times occur and may be terminated (i.e., expired) when their respective end times occur. To this end, in an embodiment, each of the section nodes 203 may be associated with one or more respective features of an app, and those features may be enabled or disabled based on the activation or termination of their respective sections. This can allow for, among other things, allowing apps to remain functional while allowing certain app features to expire based on the passage of time. This may be relevant when, for example, an app is created for a particular event and some app features are only relevant until the day after the event.

As a non-limiting example, an app represented by the NFT node 201 may function as a ticket to an event being hosted on Feb. 3, 2022, and may also have functionality related to the event such as displaying augmented reality (AR) content as part of the event. The section node 203-1 may represent app features used to grant a user access to the event (e.g., displaying a ticket on the user's device) and have an end date of Feb. 4, 2022, such that the ticket-displaying functionality of the app becomes disabled on Feb. 4, 2022. The section node 203-2 may represent app features used for displaying AR content (e.g., accessing a camera of a user device and overlaying images or video), which may also have an end data of Feb. 4, 2022. The section node 203-3 may represent app features related to collectability such as, but not limited to, displaying images showing event highlights, playing video captured at the event, and the like. In this example, the section node 203-3, unlike the other section nodes 203-1 and 203-2, may not have an end data and its corresponding app features may therefore be accessed after the event has ended. In this regard, the app NFT may act as a souvenir of the event similar to a digital version of a ticket stub, which in turn can be resold as a collectible.

Additionally, in various implementations where nodes have start and end times, the start and end times for different section nodes 203 may be coordinated such that one section is activated as another expires. In the non-limiting example above where the section node 203-3 acts as a souvenir of the event, the section node 203-3 may have a start time of Feb. 4, 2022, such that the section node 203-3 is activated as the section nodes 203-1 and 203-2 expire. When the webpage associated with these sections is regenerated in the cache after Feb. 4, 2022, the portions of the webpage related to the section nodes 203-1 and 203-2 are replaced with portions of the webpage related to the section node 203-3. Further, if the section node 203-1 or 203-2 is used by multiple webpages (e.g., when the section node 203-1 or 203-2 is connected to multiple webpage nodes, not shown), expiration of either section node may result in the corresponding section being removed from each webpage the section node is used by.

The webpage node 202 may further be connected to a website (WS) node 204 representing the website including the webpage represented by the webpage node 202. The website node 204 may further be connected to other webpage nodes (not shown) representing various webpages of the website. Additionally, the website node 204 may be connected to a location node such as a uniform resource locator (URL) node 205 representing a URL associated with the webpage. In other embodiments (not shown), each webpage node may also be connected to a corresponding URL node indicating the location of the respective webpage on the Internet.

The NFT node 201 may further be connected to a node associated with an entity that owns the NFT of the NFT node 201 such as the wallet (Wal) node 206. The wallet node 206 represents and stores data indicating ownership of the NFT represented by the NFT node 201 such that the connection between the wallet node 206 and the NFT node 201 can be utilized to confirm ownership of the NFT by the owner of the wallet. The wallet node 206 may also optionally represent a wallet (e.g., the wallet 125, FIG. 1).

The wallet node 206, in turn, may be connected to one or more cryptocurrency (Cry) nodes 207, a wallet administrator (Adm) node 208, or both. The cryptocurrency nodes 207 may represent cryptocurrency owned by the owner of the wallet. Such cryptocurrency may be used to conduct transactions involving transfers of NFTs such as using the cryptocurrency to purchase an NFT to be transferred to the wallet or receiving cryptocurrency as payment for such an NFT. The wallet administrator node 208 may be associated with an administrator of the wallet (e.g., the owner of the wallet or a third party entity who has been granted the right to act on behalf of the wallet owner), and may store data indicating policies related to use of the wallet.

In some implementations (not shown), multiple wallet administrator nodes may be connected to any given wallet node, and each administrator represented by one of the wallet administrator nodes may own a fractional share of the wallet. Each wallet administrator node may further include data indicating a percentage of ownership of the wallet by the administrator associated with the wallet administrator node. This percentage of ownership may further be connected to an accounting system (not shown), which may represent balances in any currency.

The NFT node 201 may further be connected to one or more nodes representing policies to be applied in relation to creation, use, or access of NFT nodes such as, but not limited to, a transfer node 209, a terms of service (ToS) node 211, a usage policy (UP) node 212, or a combination thereof.

The transfer node 209 may act as a minting contract, i.e., a smart contract defining policies for creation of NFT nodes for webpages (i.e., minting of webpages as NFTs). To this end, the transfer node 209 may store code that, when executed, applies the rules of the policy to the creation of NFT nodes such as the NFT node 201. Such policies may include, but are not limited to, restrictions on the number of NFTs which can be created (i.e., the number of NFT nodes which can be created) for a given webpage or portion thereof. As a non-limiting example, such a policy may limit the creation of NFTs for a given webpage to 100 NFTs total.

In some implementations, the transfer node 209 may further be connected to a provider (Pro) node 210 representing a provider of the NFT. Such a provider may be, but is not limited to, a creator of the NFT (e.g., an app developer). In this regard, the provider node 210 may serve as evidence of the originator of the NFT node 201.

The terms of service node 211 includes code that, when executed, applies the rules of one or more policies defining terms of service for an NFT. Such policies may require, for example, that a user to whom the NFT is transferred (e.g., a user of a wallet represented by a wallet node to which the NFT node will be connected) agree to terms of service before being granted ownership of or access to the NFT.

The usage policy node 212 includes code that, when executed, applies the rules of one or more policies defining restrictions on use of an NFT, access to the NFT, both, and the like. Such restrictions may include, but are not limited to, requiring that NFTs not be shared for free, limiting the number of uses of a given NFT, and the like. In various embodiments, multiple usage policies (which may be represented by multiple usage policy nodes, not shown), may be applied to any given NFT or series of NFTs. The usage policies may be defined by a platform for the NFTs, a marketplace for the NFTs, a provider of an NFT, or a combination thereof, depending on the implementation.

In a further embodiment, the usage policy represented by the usage policy node 212 may require an access code before using or accessing the NFT of the connected NFT node 201 in order to prevent unauthorized access. To this end, the NFT node 201 may also be connected to an access code (AC) node 213 representing an access code required to use or access the NFT. As a non-limiting example, before web content of the webpage represented by the webpage node 202 is provided, a user of the wallet represented by the wallet node 206 or other user indicated by the wallet node 206 may be required to enter the access code indicated by the access code node 213.

Figure 2B:
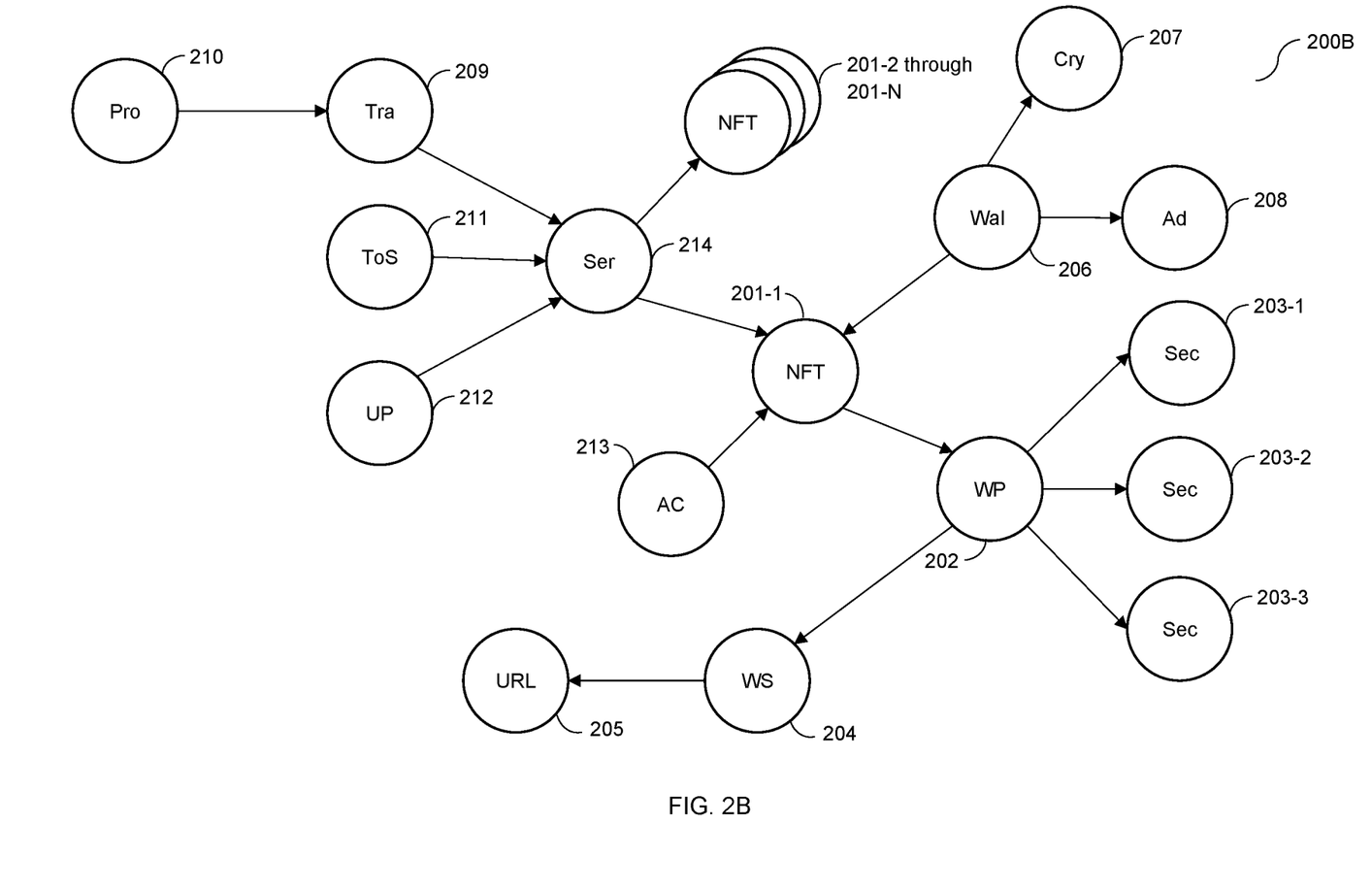
FIG. 2B is a visual depiction of nodes in a database including a token series node.

FIG. 2B is a non-limiting example visual depiction 200B of nodes in a database including a token series node. As depicted in FIG. 2B, the nodes of the database further include an NFT series (Ser) node 214. The NFT series node 214 may define a series of related apps such as, but not limited to, apps acting as respective tickets to the same event, apps of the same type (e.g., effectively different copies of the same app), and the like.

The NFT series node 214 is connected to multiple NFT nodes including the NFT node 201-1 and other NFT nodes 201-2 through 201-N. As depicted in FIG. 2B, the series node 214 may be connected to any of the transfer node 209, the terms of service node 211, and the usage policy node 212, such that rules and policies defined in data of those nodes may be applied to all of the NFTs represented by the NFT nodes 201-1 through 201-N. Accordingly, using series nodes such as the NFT series node 214 allows for defining policies for groupings of NFTs rather than defining policies individually per NFT. As new NFTs are added to a series (for example, by connecting new NFT nodes to the NFT series node 214), the policies for the NFT series node 214 may be automatically linked to their respective NFT nodes via the connections in the database.

Further, in another implementation (not depicted in FIG. 2B), additional policy-related nodes (e.g., additional transfer nodes, terms of service nodes, and/or usage policy nodes) may be connected to any or all of the NFT nodes 201-1 through 201-N such that, in addition to any policies applicable to all NFTs in the series, each NFT may have its own policies applied.

It should be noted that FIGS. 2A and 2B depict various specific numbers of nodes, numbers of connections, types of nodes, and connections between different types of nodes for example purposes, but that the disclosed embodiments are not necessarily limited to the specific depiction of nodes and connections illustrated in FIGS. 2A and 2B. In particular, only one instance of many types of nodes are depicted in FIGS. 2A and 2B for simplicity purposes, but in various implementations multiple of each node may be included without departing from the scope of the disclosure. Further, the additional NFT nodes 201-2 through 201-N are depicted without connections to nodes other than the series node 214 merely for simplicity, and that, in various implementations, each of these NFTs 201-2 through 201-N may be connected to other nodes.

Figure 3:
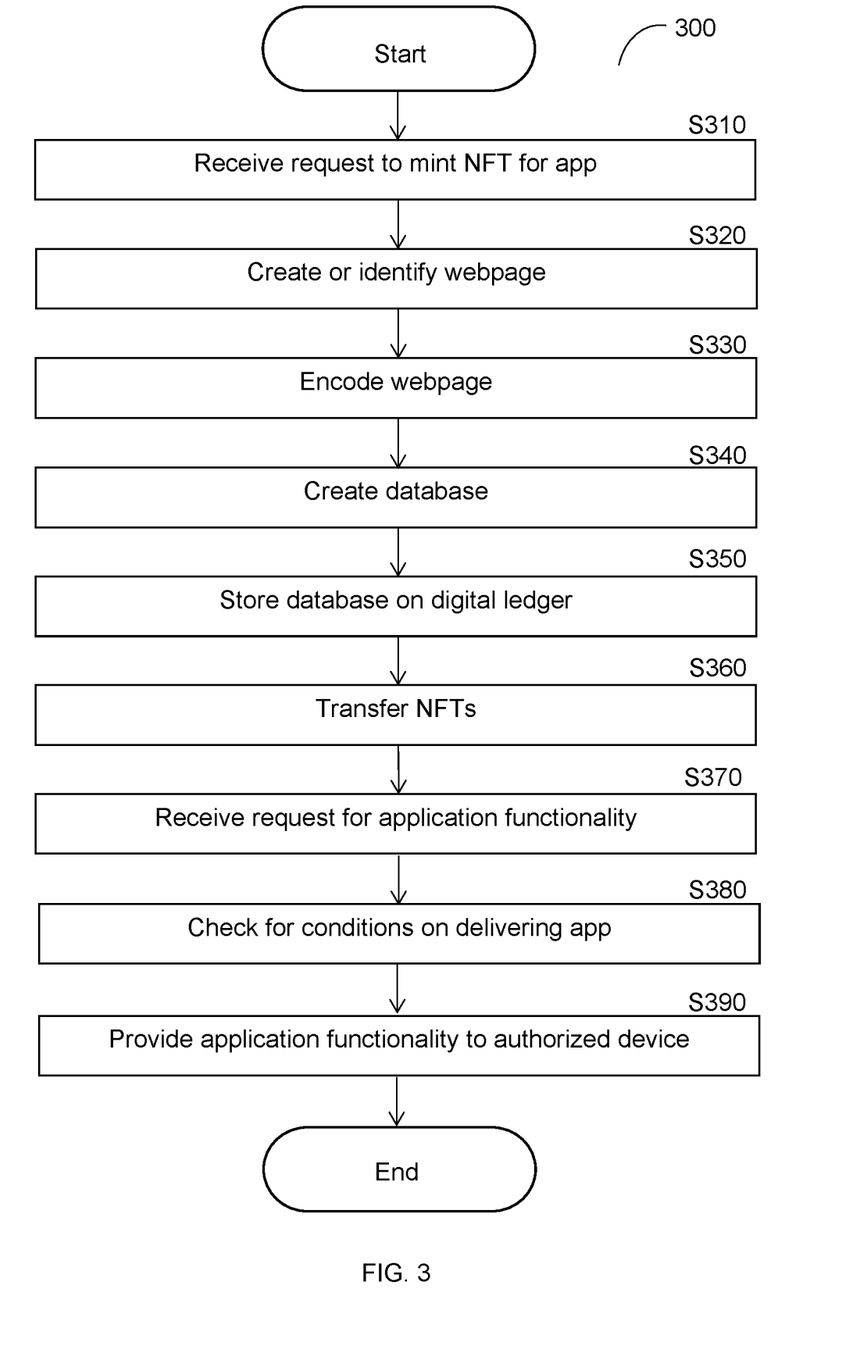
FIG. 3 is a flowchart illustrating a method for providing apps as NFTs according to an embodiment.

FIG. 3 is a flowchart illustrating a method for tokenizing apps as non-fungible tokens (NFTs) and providing app functionality via NFT nodes according to an embodiment. In an embodiment, the method is performed by the app provider 130.

At S310, a request to mint an NFT for a software application (app) or portion thereof is received. The request may include, but is not limited to, information needed to access the app (e.g., a location of the app, authentication credentials, etc.), contents of the app (e.g., software instructions for performing tasks associated with the app), combinations thereof, and the like. The request may further include various restrictions to be applied to the NFTs representing the webpage. Such restrictions may include, but are not limited to, terms of service, usage policies, access codes, combinations thereof, and the like. The minting process at least includes encoding all or a portion of the webpage as well as adding tokens for the webpage to a database as described further below.

The webpage is associated with one or more apps, portions of apps, or a combination thereof, and includes at least instructions for performing tasks associated with the respective apps and portions. As a non-limiting example where an app is a game app for playing poker, the webpage includes instructions for displaying cards and a digital poker table as well as instructions for randomizing a deck, for making decisions by computer players, for tracking chips, and the like. As a non-limiting example where an app functions as a ticket for an event, the webpage at least includes instructions for displaying an access pass (e.g., an image of a ticket) to the event on a user device, and may further include instructions for other event-related tasks such as displaying a digital gift shop for the event, providing a payment portal for goods sold at the event, projecting media content associated with the event, combinations thereof, and the like.

At S320, a webpage for the app is created or identified. The webpage may be an existing webpage including software instructions for performing certain tasks that is identified based on a locator received with the request at S310, or may be created based on instructions provided by an app developer or other provider of the app which the webpage will be based on. By creating a webpage including instructions for performing tasks of the app, an existing app can effectively be converted into a webpage and tokenized as described herein.

At S330, the webpage is encoded into one or more portions of code. The portions of code include instructions that, when executed by a system (for example, the user device 120, FIG. 1), causes the system to perform tasks of the respective apps or portions thereof. Accordingly, such code can be stored in a database (specifically, in nodes of the database) such that the appropriate code can be provided (e.g., to a user device) when the owner of the NFT representing the respective portion(s) of code requests to access the application functionality of the app, and execution of the code on a device of that owner allows for performing the tasks associated with the app.

At S340, a database is created based on the encoded webpage. Creating the database may include creating a new database or adding to an existing database.

The created database includes nodes, and the portions of code of the encoded webpage are distributed among at least some of the nodes of the database. In an embodiment, the database at least includes webpage nodes and NFT nodes. Each webpage node is associated with a respective webpage and indicates at least a portion of the respective webpage that is represented by the node. Each NFT node represents an NFT indicating ownership of a webpage or portion thereof. Each NFT node is at least connected to one or more webpage nodes. In a further embodiment, the portions of code are distributed among the webpage nodes.

The NFT nodes represent tokens which indicate ownership of one or more non-interchangeable assets with respect to a webpage. In accordance with various disclosed embodiments, each non-interchangeable asset is an app or a portion of an app, where the app or portion of the app includes instructions for performing one or more tasks by a computing device. The NFT nodes may therefore represent ownership of the underlying apps or portions thereof.

The NFTs include tokens representing non-interchangeable items such as different apps or distinct copies of the same app. An NFT is a non-interchangeable token representing a digital item (i.e., a data item). These tokens are non-interchangeable at least in that any given NFT is not necessarily equivalent to any other NFT, in other words, at least some NFTs represent different underlying digital assets as compared to at least some other NFTs. It should be noted that some NFTs may be equivalent to each other without departing from the scope of the disclosed embodiments. As a non-limiting example, some NFTs may be NFTs representing different copies of the same media player app and may effectively provide the same application functionality as each other.

In some embodiments, multiple NFT nodes may be connected to a given webpage node, thereby establishing fractional ownership of the webpage, the underlying item represented by the webpage, or both. Such fractional ownership may include equal shares of ownership or may be defined as percentage ownerships that may differ among the multiple owners. In some implementations, when an NFT having multiple owners with fractional ownership (i.e., an NFT represented by an NFT node among multiple NFT nodes connected to a given webpage node) is transferred in exchange for a different item or currency, ownership of the item or currency may be distributed among the fractional owners according to their respective shares or percentage ownership.

The nodes of the database may further include other types of nodes such as, but not limited to, wallet nodes, website nodes, location identifier nodes (e.g., uniform resource locator or URL nodes), section nodes, transfer nodes, terms of service nodes, usage policy nodes, content nodes, combinations thereof, and the like. Various types of nodes are depicted in and described with respect to FIGS. 2A-B as discussed above.

Figure 4:
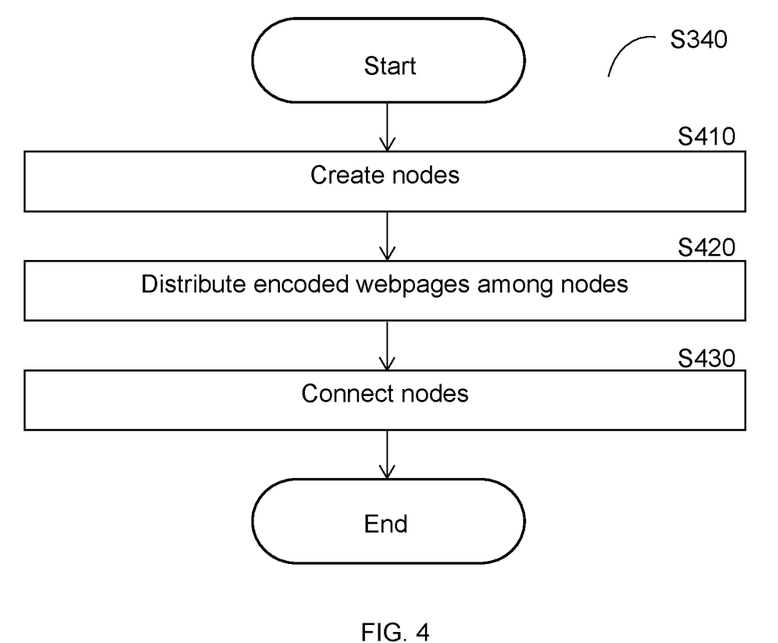
FIG. 4 is a flowchart illustrating a method for creating an NFT database according to an embodiment.

In an embodiment, the database may be created as discussed with respect to FIG. 4. FIG. 4 is a flowchart S340 illustrating a method for creating an NFT database according to an embodiment.

At S410, nodes of the database are created. In an embodiment, the nodes in the database at least include webpage nodes representing encoded webpages or portions thereof as well as NFT nodes representing NFTs indicating ownership of respective webpages or portions thereof. In a further embodiment, the nodes of the database include nodes associated with entities who own the NFTs such as wallet nodes representing wallets owned by such entities or owning entity nodes representing the entities themselves. In yet a further embodiment, the nodes of the database may further include any of the other nodes described above with respect to FIGS. 2A and 2B. It should be noted that the database may include other nodes without departing from the scope of the disclosure.

In some embodiments, the nodes of the database may further store historical data of transactions in which NFTs are transferred. To this end, in a further embodiment, creating the nodes may further include storing initial transaction data in one or more of the nodes. As a non-limiting example, transaction data representing the initial creation of each NFT may be stored in the respective NFT node for each NFT when the NFT nodes are created. Alternatively the initial transaction data may be null data representing that no transactions involving the NFT have occurred yet.

The transaction data stored in the database may be used to demonstrate authenticity of any given NFT represented by one of the NFT nodes in the database. As a non-limiting example, the webpage of a given NFT may include an icon or other interactable artifact representing an authenticity token, which in turn has a corresponding certificate of authenticity webpage. Such a certificate of authentication webpage may include information such as, but not limited to, transaction history for the NFT, a creator of the NFT, a source NFT platform on which the NFT was sold, serial number, associated series (e.g., a series represented by a series node such as the series node 214, FIG. 2B), usage statistics (e.g., how often the app is used), applicable usage policies, terms of a minting contract, rights contract, terms of service, or any other information that may be relevant to understanding use or ownership of the app as an NFT. This information may at least partially be derived from data stored in the database such as the transaction data.

At S420, the portions of code of encoded webpages are distributed among the created nodes. In an embodiment, the portions of code may be distributed into webpage nodes of the respective webpages which were encoded into those portions of code. As a non-limiting example, a first webpage may be encoded into a first portion of code and a second webpage may be encoded into a second portion of code such that the first portion of code is distributed to a first webpage node representing the first webpage and the second portion of code is distributed to a second webpage node representing the second webpage.

At S430, the created nodes are connected. In an embodiment, the created nodes are connected at least such that each NFT node is connected to a respective webpage node representing the apps or portions thereof to be provided as an NFT. In a further embodiment, the created nodes may be connected such that each NFT node is also connected to a wallet node or owning entity node associated with the entity who owns the NFT. In another embodiment, the created nodes may be connected such that each NFT node is further connected to nodes for enforcing restrictions on use or access of the respective NFT such as, but not limited to, transaction nodes, terms of service nodes, usage policy nodes 212, access code nodes 213, combinations thereof, and the like.

Returning to FIG. 3, at optional S350, the database is stored on a digital ledger. In an embodiment, S350 may include uploading the database to a decentralized digital ledger such as a blockchain. As noted above, storing the database on a blockchain allows for ensuring the accuracy of the data in the database by providing an immutable record against which the database can be compared when making transfers, and storing the database on a decentralized ledger in addition to a centralized ledger allows for portability, i.e., the database may be transferred to a new digital ledger relatively easily. As a non-limiting example, the database may be stored as a side chain on a blockchain.

At optional S360, one or more of the apps represented by respective NFT nodes are transferred to a new owner. In an embodiment, S360 may occur when a request to transfer an app is received from a current owner of the NFT node representing the app. The request may indicate to transfer the NFT nodes immediately or upon meeting one or more conditions. The request may be received from a wallet of the current owner.

In an embodiment, transferring the NFTs may include reconnecting the respective NFT nodes corresponding to those NFTs. An example method for transferring NFTs via the database is described further below with respect to FIG. 5.

At S370, a request for application functionality is received. The request may indicate, for example, the app associated with the webpage (e.g., an NFT represented by an NFT node connected to a webpage node of the webpage in the database). The request may further include other information for accessing the webpage content such as, but not limited to, authentication credentials, authorized devices or accounts (i.e., devices or accounts that are authorized to access the content), both, and the like.

In various embodiments, the request may be received by a user navigating, via their user device, to a location (e.g., a uniform resource locator) of a webpage corresponding to the app NFT they own. When the user navigates to such a location (e.g., via a browser software application installed on the user device), the user device requests the web content of the webpage from a host server, thereby requesting the app functionality. When the host server provides such web content to the user device and the code included therein is executed on the user device, the user device becomes configured to perform one or more tasks of the corresponding app.

In some embodiments, the request may be for content of multiple webpages. As a non-limiting example, a user may own multiple apps as NFTs and may wish to combine app features from these apps into a single webpage. Because the content from these webpages is encoded and reflected in discrete nodes of the database, these different portions of content can be incorporated into a single webpage, for example, using a predefined template into which the portions of code are inserted.

At optional S380, any conditions for delivering the requested app (i.e., the app or portion thereof for which application functionality has been requested) are identified. Such conditions may be defined in data of nodes associated with the NFT node such as, but not limited to, usage policy nodes or terms of service nodes. To this end, in an embodiment, S380 may include scanning the database for nodes connected (either directly or indirectly, i.e., through other nodes) to the NFT node and identifying conditions defined in those nodes. The conditions are applied when providing the requested content and may be used to limit how the content is used or to deny access to the content entirely. The conditions may be set by different entities, for example, some conditions may be set by an operator of an NFT platform (e.g., an NFT platform), other conditions may be set by an originator of an NFT (e.g., an artist who created a work represented by an NFT or PDT), and yet other conditions may be set by an entity that provides the web-based content for tokenization (e.g., a record company, publisher, webpage owner, etc.).

At S390, the requested application functionality is provided to an authorized device, i.e., a device authorized to access the app by the owner of the respective NFTs associated with the webpage via the nodes of the database or a device used by a user of an authorized account indicated in the request. This effectively results in delivering the app to the user's device, at least temporarily. In an embodiment, S390 includes providing the respective portions of code through which the webpage is encoded to the authorized device. Because the portions of code of a webpage include instructions for performing tasks that provide certain app features and functionality, the authorized device can execute the portions of code, thereby causing the authorized device to perform such tasks and provide the user with features of the respective apps or portions thereof.

In some implementations, content of the webpage and, in particular, the code for providing the application functionality, may be stored on the user device for subsequent use. As a non-limiting example, the code may be stored in a cache. Storing the code in a cache or other local storage of the user device allows for accessing the app even when the user device is not connected to the Internet. In other implementations, an Internet connection may be required to access a given app.

In an embodiment, the conditions identified at S380 are applied. It should be noted that, in some implementations, when a condition defining whether an app can be shared is not met, web content including the instructions for performing tasks of the app may not be provided at S390. As a non-limiting example, when a usage policy node associated with an NFT node representing an NFT includes data defining a condition limiting the number of times the NFT may be shared or viewed per day to 5 times per day and the NFT has already been shared or viewed 5 times in 24 hours, access to the NFT may be denied and the web content is not provided to the otherwise authorized device. Optionally, a notification indicating the failure to meet one or more conditions may be sent to the authorized device or to a user device associated with the user who owns the NFT.

Figure 5:
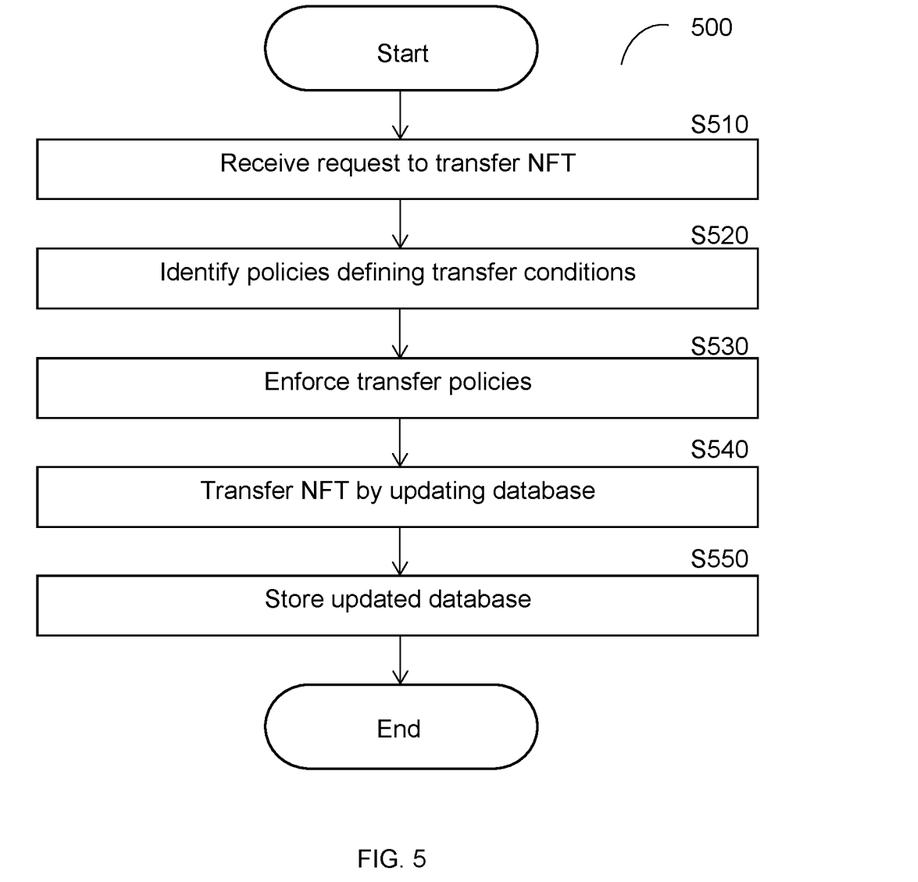
FIG. 5 is a flowchart illustrating a method for transferring NFTs nodes of webpages using a database according to an embodiment.

FIG. 5 is an example flowchart 500 illustrating a method for transferring non-fungible token nodes of webpages using a database according to an embodiment. In an embodiment, the method may be performed by the app provider 130, FIG. 1.

At S510, a request to transfer a non-fungible token (NFT) is received. The request indicates information to be used for determining how to alter a database storing nodes in order to realize the transaction such as, but not limited to, an identifier of the NFT being transferred, an identifier of a first user from whom the NFT is being transferred, an identifier of a second user to whom the NFT is being transferred, identifiers of wallets of such users, identifiers of tokens of any of the foregoing, combinations thereof, and the like.

At optional S520, policies defining any potential transfer conditions on transferring the NFT are identified. Such conditions may be defined in data included in, for example, nodes of the database storing the NFT node representing the NFT. To this end, S520 may include scanning a database including an NFT node representing the NFT to be transferred for any nodes defining policies related to transferring the NFT such as, but not limited to, a transfer node or a terms of service node connected to such an NFT node or to an NFT series node of an NFT series the NFT belongs to. In an example implementation, the policies related to transferring the NFT may include a requirement that the user to which the NFT node is transferred must accept terms of service for the transferred NFT.

At optional S530, the policies defining the applicable transfer conditions identified at S520 are enforced. In the example implementation where the policies require the new owner to accept terms of service, S530 may include presenting the terms of service (e.g., by sending a notification for display on a user device of the new owner) and receiving a response indicating whether the user accepted the terms of service. In some implementations, if requirements of the policies related to transfers are not met, the NFT may not be transferred to the new owner.

At S540, the database is updated in order to transfer the NFT. In an embodiment, S540 includes modifying connections in the database including the NFT node representing the NFT such that the NFT is connected to a different node associated with the owning entity (e.g., a different wallet node or a different owning entity node).

More specifically, the transferred NFT may be initially connected to a node associated with the current owner (e.g., a wallet node associated with a wallet owned by the current owner of the NFT nodes or an owning entity node representing the current owner) and then reconnected to a node associated with the new owner instead. The database including the reconnected nodes is therefore updated.

In a further embodiment, updating the database may further include updating historical data stored in nodes of the database related to transactions. As a non-limiting example, historical data of transactions in which an NFT was transferred may be stored in an NFT node corresponding to the NFT such that updating the database may include adding a new entry to the historical data stored in the NFT node.

At optional S550, the updated database may be stored in a centralized data storage, a decentralized ledger such as a blockchain, or both.

Figure 6:
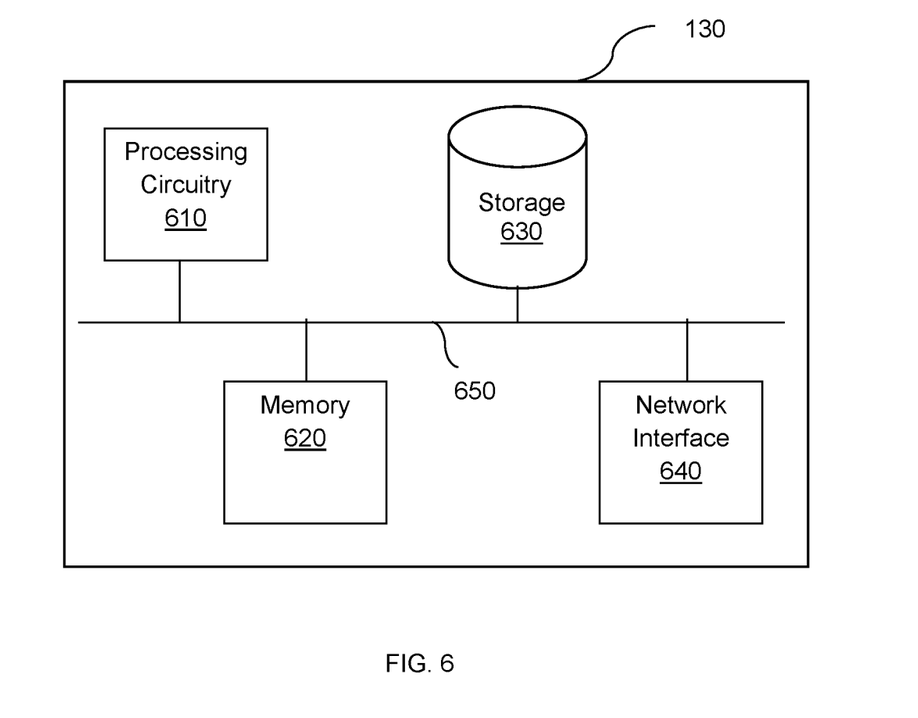
FIG. 6 is a schematic diagram of an app provider according to an embodiment.

FIG. 6 is an example schematic diagram of a software application (app) provider 130 according to an embodiment. The app provider 130 includes a processing circuitry 610 coupled to a memory 620, a storage 630, and a network interface 640. In an embodiment, the components of the app provider 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the app provider 130 to communicate with, for example, the user device 120, the data storage 140, the app sources 150, the blockchain network 160, combinations thereof, and the like.

It should be understood that the embodiments described herein are not limited to the specific architecture illustrated in FIG. 6, and other architectures may be equally used without departing from the scope of the disclosed embodiments.

It should be noted that the above discussion refers to apps or portions of apps, and that these references do not necessarily limit any of the disclosed embodiments. Specifically, a software application, or app as referred to herein, is a computer program designed to perform one or more computing tasks. To this end, each app has corresponding code for performing its respective tasks. A first app could be a portion of a second app, namely, if the first app has a subset of the code of the second app such that it configures a device to perform some, but not all, tasks that the second app configures the device perform. Any reference to an app herein does not necessarily refer to the entire original app, and may include only a portion of the original app without departing from the disclosed embodiments. As a non-limiting example, a music app may have code for performing tasks related to purchasing music as well as tasks related to playing media content (e.g., music audio), and each of these sets of code may be referred to as an app or as a portion of an app since each set of code is designed to perform one or more tasks that are a part of an original app. Designating apps as portions of other apps may be useful, for example, when different app features of an original app are to be implemented with different restrictions such as, but not limited to, different start and end times as discussed above with respect to section nodes.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing application functionality via tokenized software applications, comprising:
   encoding a webpage into at least one portion of code, wherein the webpage is associated with at least one software application, wherein the at least one software application is associated with at least one computing task, wherein the at least one portion of code at least configures a device to perform the at least one computing task when the at least one portion of code executed on the device;
   creating a database including a plurality of nodes, the plurality of nodes including a webpage node associated with the webpage and at least one non-fungible token (NFT) node associated with the at least one software application, wherein the encoded at least one portion of code of the webpage is stored among a portion of the plurality of nodes, wherein the at least one NFT node is connected to the webpage node, wherein each of the at least one NFT node corresponds to one of the at least one software application; and
   providing the at least one portion of code to the device authorized by an owner of the at least one NFT node.

2. The method of claim 1, wherein the at least one portion of code further configures the device to access at least a portion of the database when the at least one portion of code is executed on the device, wherein the at least one computing task is performed based on the accessed at least a portion of the database.

3. The method of claim 2, wherein the database further includes a wallet node associated with the owner of the at least one NFT node and connected to each of the at least one NFT node, wherein the accessed at least a portion of the database includes the wallet node.

4. The method of claim 3, wherein the at least one computing task further includes processing a transaction, wherein processing the transaction includes identifying at least one currency held by a wallet represented by the wallet node associated with the owner of the at least one NFT node, wherein the transaction is processed using the identified at least one currency.

5. The method of claim 3, wherein the at least one computing task further includes verifying an identity of a user of the device, wherein verifying the identity of the user of the device includes identifying the wallet node connected to the at least one NFT node in the database.

6. The method of claim 1, wherein the at least one portion of code is provided to the device when the device navigates to the webpage.

7. The method of claim 1, wherein the at least one portion of code is stored in a cache of the device.

8. The method of claim 1, wherein the webpage has at least one section, each section of the webpage corresponding to one of the at least one app, wherein the plurality of nodes further includes at least one section node, wherein each section node is connected to the webpage node, wherein each section node includes one of the at least one portion of code.

9. The method of claim 8, wherein each section node is associated with at least one of a respective start time and a respective end time, wherein the portion of code included in each section node is at least one of activated based on the respective start time and deactivated based on the respective end time.

10. A non-transitory computer readable medium having stored thereon instructions for causing a processing circuitry to execute a process, the process comprising:
    encoding a webpage into at least one portion of code, wherein the webpage is associated with at least one software application, wherein the at least one software application is associated with at least one computing task, wherein the at least one portion of code at least configures a device to perform the at least one computing task when the at least one portion of code executed on the device;
    creating a database including a plurality of nodes, the plurality of nodes including a webpage node associated with the webpage and at least one non-fungible token (NFT) node associated with the at least one software application, wherein the encoded at least one portion of code of the webpage is stored among a portion of the plurality of nodes, wherein the at least one NFT node is connected to the webpage node, wherein each of the at least one NFT node corresponds to one of the at least one software application; and
    providing the at least one portion of code to the device authorized by an owner of the at least one NFT node.

11. A system for providing application functionality via tokenized software applications, comprising:
    a processing circuitry; and
    a memory, the memory containing instructions that, when executed by the processing circuitry, configure the system to:
    encode a webpage into at least one portion of code, wherein the webpage is associated with at least one software application, wherein the at least one software application is associated with at least one computing task, wherein the at least one portion of code at least configures a device to perform the at least one computing task when the at least one portion of code executed on the device;
    create a database including a plurality of nodes, the plurality of nodes including a webpage node associated with the webpage and at least one non-fungible token (NFT) node associated with the at least one software application, wherein the encoded at least one portion of code of the webpage is stored among a portion of the plurality of nodes, wherein the at least one NFT node is connected to the webpage node, wherein each of the at least one NFT node corresponds to one of the at least one software application; and
    provide the at least one portion of code to the device authorized by an owner of the at least one NFT node.

12. The system of claim 11, wherein the at least one portion of code further configures the device to access at least a portion of the database when the at least one portion of code is executed on the device, wherein the at least one computing task is performed based on the accessed at least a portion of the database.

13. The system of claim 12, wherein the database further includes a wallet node associated with the owner of the at least one NFT node and connected to each of the at least one NFT node, wherein the accessed at least a portion of the database includes the wallet node.

14. The system of claim 13, wherein the at least one computing task further includes processing a transaction, wherein processing the transaction includes identifying at least one currency held by a wallet represented by the wallet node associated with the owner of the at least one NFT node, wherein the transaction is processed using the identified at least one currency.

15. The system of claim 13, wherein the at least one computing task further includes verifying an identity of a user of the device, wherein verifying the identity of the user of the device includes identifying the wallet node connected to the at least one NFT node in the database.

16. The system of claim 11, wherein the at least one portion of code is provided to the device when the device navigates to the webpage.

17. The system of claim 11, wherein the at least one portion of code is stored in a cache of the device.

18. The system of claim 11, wherein the webpage has at least one section, each section of the webpage corresponding to one of the at least one app, wherein the plurality of nodes further includes at least one section node, wherein each section node is connected to the webpage node, wherein each section node includes one of the at least one portion of code.

19. The system of claim 18, wherein each section node is associated with at least one of a respective start time and a respective end time, wherein the portion of code included in each section node is at least one of activated based on the respective start time and deactivated based on the respective end time.

* * * * *